Sept. 15, 1970     H. G. QUASE     3,528,462

SEWAGE DISPOSAL

Filed March 4, 1968     2 Sheets-Sheet 1

INVENTOR
HAROLD G. QUASE

BY *J. M. Aisenberg*
ATTORNEY

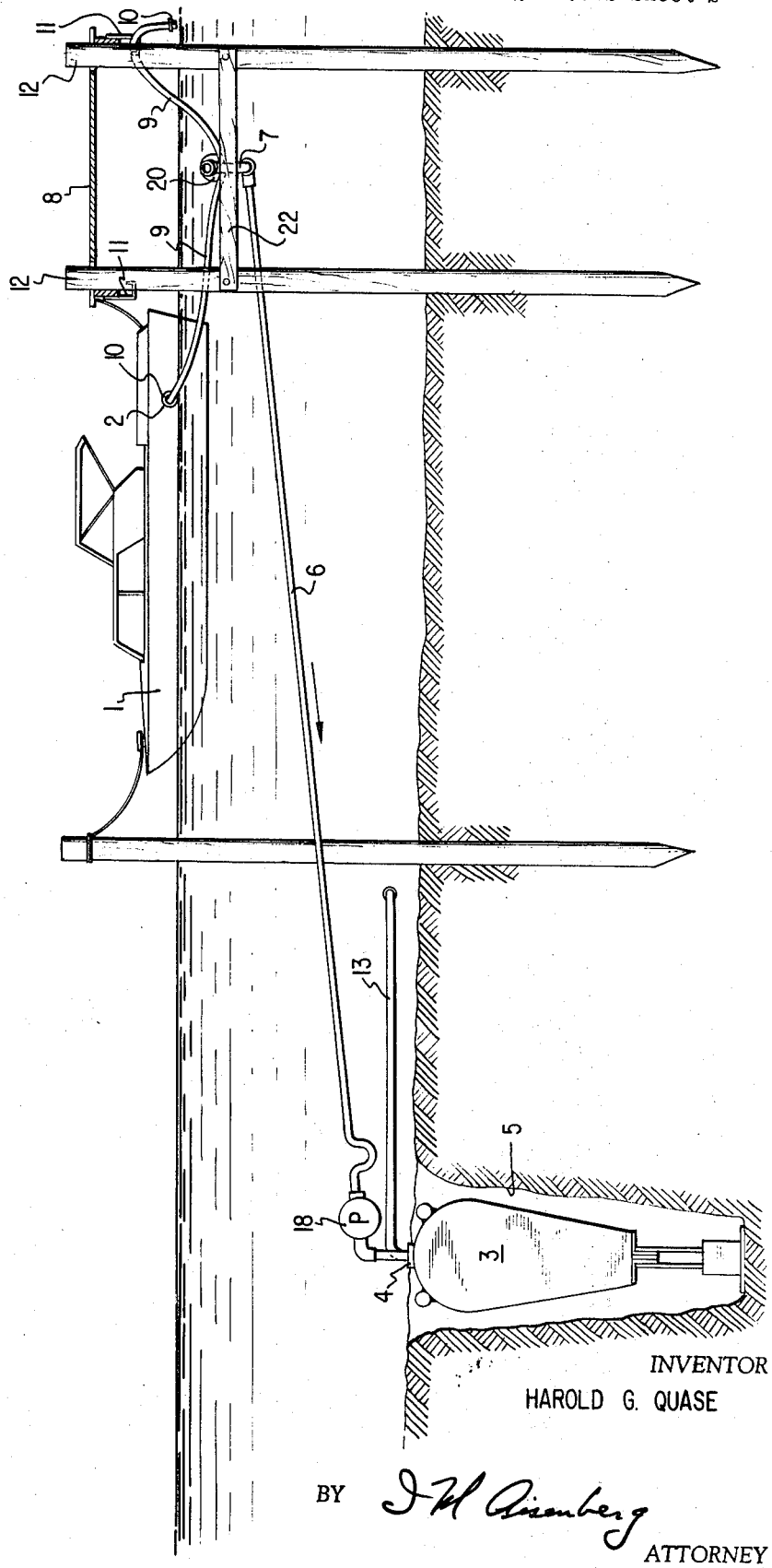

United States Patent Office 3,528,462
Patented Sept. 15, 1970

3,528,462
SEWAGE DISPOSAL
Harold G. Quase, Kensington, Md., assignor to
Underwater Storage, Inc., Washington, D.C.
Filed Mar. 4, 1968, Ser. No. 710,084
Int. Cl. E03f 5/00
U.S. Cl. 141—284
9 Claims

ABSTRACT OF THE DISCLOSURE

A permanent sewage collection system associated with, e.g., marinas disposes of waste from craft docked thereat. The collection system comprises underwater storage and means for conveying the waste from the craft to the underwater storage.

BACKGROUND OF THE INVENTION

Small pleasure boats which have toilet and/or other waste facilities face a continual problem when docked of disposing of such waste without contaminating waterways. With the increasing number of such boats the problem is multiplied.

Pleasure craft having toilet facilities often dispose of effluent therefrom directly into the waterways during trips. Such disposal while docked at a marina, however, would seriously contaminate the marina area and deter other boat owners from patronizing the marina. Since those having such craft often spend considerable time in them, even when docked, it is extremely difficult to police their use of toilet facilities at a marina.

These pleasure craft often have flushing means associated with their toilet facilities. The flushing means promotes the efflux of the sewage.

Marinas have been established for docking and, sometimes, attending to numerous needs for both the boats and those who sail in them. It is only natural for marinas to provide means for disposing of sewage while craft are docked thereat. Providing such means materially enhances the marinas and preserves the cleanliness of the surroundings.

SUMMARY OF THE INVENTION

The invention is a simple underwater collection and storage system for disposing of sewage from such pleasure craft as may be docked, e.g., at a marina. An underwater storage means, e.g. one or more permanent or portable storage tanks, is connected, through piping, to a flexible coupling means capable of attachment to waste disposal systems of docked boats having toilet facilities.

It is an object of this invention to provide a permanent installation for marinas to collect sewage from boats docked thereat. It is a further object of this invention to store collected sewage under water until it is convenient to dispose of it otherwise. Another object of this invention is to employ the force of gravity to facilitate sewage removal from boats. A still further object of this invention is to make possible at minimum expense, a permanent installation which may be provided by marinas for the removal of sewage from small sailing vessels. Additional objects are apparent from the following description and drawings.

BRIEF DESCRIPTION OF THE DRAWINGS

FIG. 2 is a vertical front view of the installation of FIG. 1.

DETAILED DESCRIPTION

Figure 1:
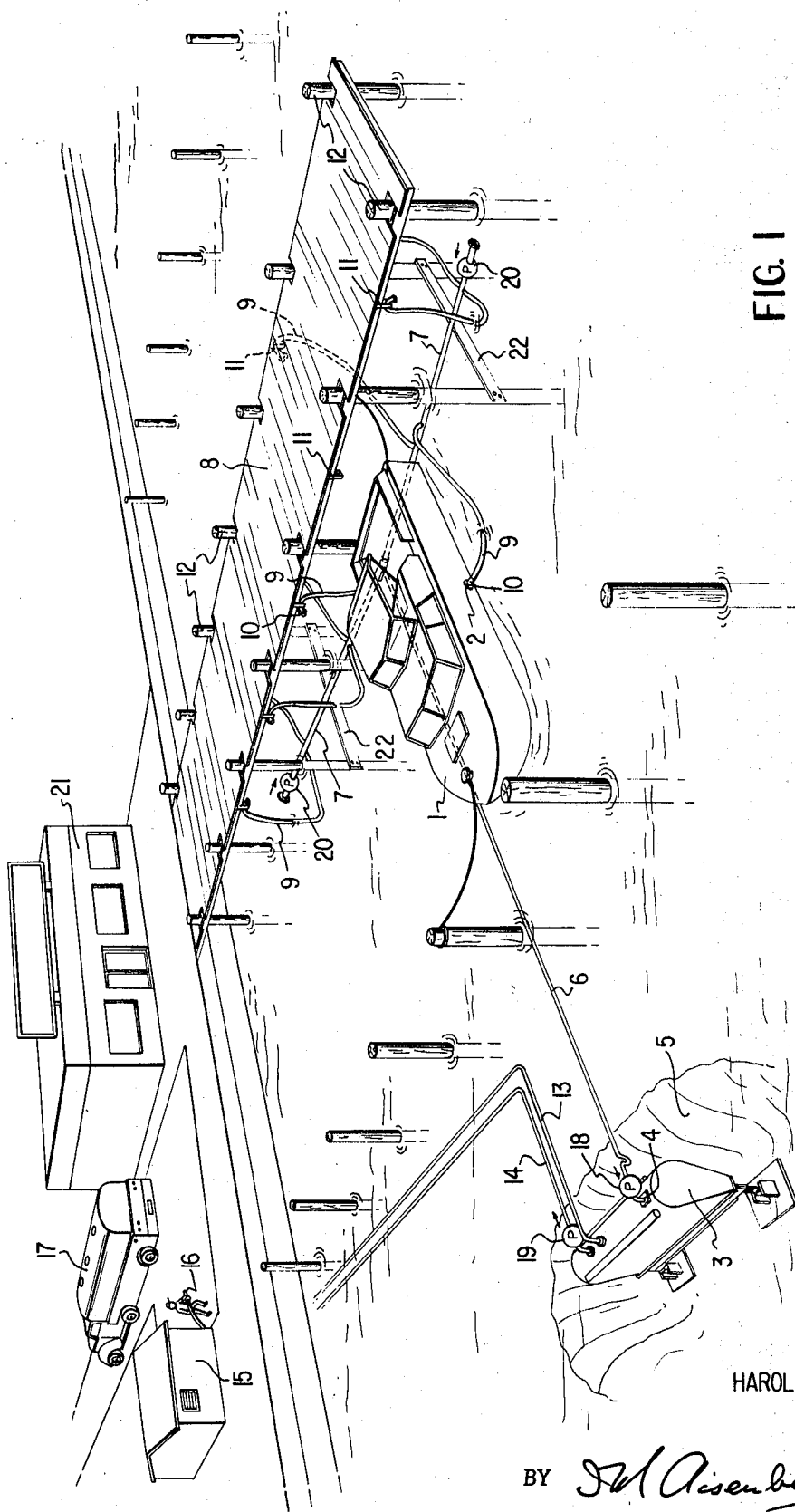
FIG. 1 is a general perspective view of an installed marina sewage collection system.

Small boats, such as boat 1, having toilet and/or other waste facilities aboard and access to the effluent therefrom through means, such as a port 2, require means for removing waste without contaminating the water of the marina where they dock. To collect and store sewage removed from such boats 1, there is provided one or more underwater storage tanks 3 anchored so that inlet 4 is well below the lowest water level. To achieve this end, the tank(s) may be placed, if necessary, in a suitable hole 5 prepared for this very purpose.

All references to an underwater storage tank or tanks includes installations having one or more tanks. The tanks may be virtually of any capacity, e.g. from 25 to one million gallons, but are preferably of at most 100,000 gallon capacity. The tanks employed in any given installation need not be of the same capacity. Moreover, they can be permanently fixed standard-type storage tanks, collapsible tanks such as those described in my prior Pat. No. 3,187,793, or portable tanks such as those described in my prior Pat. No. 3,114,384. Although there is a readily apparent material advantage to employ a plurality of portable tanks so that they may be readily removed to a remote location in the waterway for flushing and cleansing from time to time, some or all of the tanks may be of the permanently fixed type. The description of piping applies to each tank. When more than one tank is employed, the piping and valving are arranged according to standard accepted practice to make possible the use of any of the tanks at any particular time.

A pipe or conduit 6 leads from inlet 4 to a service line 7, which is suitably fixed, e.g., parallel to a pier 8 and submerged in water at a level below any port 2 above inlet 4. Conduit 6 and line 7 should be so located that any boat 1 docking at the marina would not be in danger of coming in contact with either of them. It is preferred that the elevation of service pipe 7 above inlet 4 and below port 2 be such as to permit conducting effluent sewage from boat 1 by gravity (assisted by any flushing system possessed by boat 1).

Flexible conduit 9, connected directly to service line 7, is provided with a coupling means 10 suitable for attachment to the waste line of boat 1 through, e.g., port 2. A hanger 11 secured to, e.g., pier 8 or pile 12 retains the flexible conduit 9 when said conduit 9 is not in use. Plural conduits 9 and hangers 11 may be provided at stations along pier 8 for any number of boats 1 docked on either side thereof. The hanger can comprise a positive clamping means, as are well-known.

Service line or pipe 7 may be secured on cross-pieces 22 fastened to piles 12 on either side of pier 8.

Tank 3 may be secured by any suitable anchorage means, such as that described in my prior Pat. No. 3,155,280. Said tank is provided with a vent 13 to the atmosphere and an outlet pipe 14 for intermittent removal of the waste stored therein. The outlet pipe 14 can lead, e.g., to a pump house 15, wherein suitable means 16 are provided for transferring stored waste to some means of land transportation 17 for carrying same to a proper depository.

To assist in the transferring of the waste, a pump 18 can be located in conduit 6 immediately adjacent inlet 4 to facilitate the removal of sewage from a boat 1 or a pump 19 can be located in outlet pipe 14 in a position on or near tank 3 to facilitate the emptying of said tank. Either pump may be actuated by any suitable means, e.g. electrically. Pump 18 can be actuated by a switch located on or near hanger 11 and connected to pump 18 by wires placed in conduit adjacent to pier 8, pile 12, cross-piece 22, service line 7 and conduit 6. In like manner pump 19 can be actuated by a switch located in pump house 15 and connected to pump 19 by wires placed in conduit adjacent outlet pipe 14.

To clean service line 7 and conduit 6 a pump 20 may be placed at either or both ends of service line 7 to pump water through this line and through conduit 6 into tank 3. Actuation of such pumps is preferably by means located remote from pier 8, such as from within building 21 or pump house 15.

The overall collection system lends itself to a multitude of modifications. A valve may be provided at the connection between flexible conduit 9 and service line 7 so as to prevent sewage from going from one conduit 9 through service line 7 to another conduit 9 rather than into conduit 6. The valve can be opened automatically by known means when conduit 9 is removed from hanger 11. To facilitate the desired flow of sewage, the service line 7 can be V shaped with the point of connection with conduit 6 at a lower elevation than that of either end.

The coupling means 10 may be of any known type suitable for attaching to and detaching from the effluent line of a waste facility of boat 1.

Each boat 1 which docks at a docking station at a marina having the subject sewage collection system has accessible to it a flexible line 9 and coupling means secured by a hanger 11. The flexible line and coupling means attached thereto are removed from the hanger and coupled, e.g. through an access above-water port 2, to the effluent line from the toilet(s) or other waste facility. Since the point of coupling is at a higher elevation than the service line 7 or the inlet 4, all sewage entering line 9 is assisted by gravity flow to a storage tank 3. Any flushing means associated with the toilet(s) further promotes the flow of sewage through the several lines to the storage tank. Pumps, such as pump(s) 20 can be provided to clean the lines from time to time. Pump 18 can be employed to facilitate the flow of waste.

Hooking up to the sewage collection system is thus a routine part of docking and makes possible the use of all waste facilities aboard (while in port) without polluting the surrounding water.

When boat 1 is being prepared to leave the marina, line 9 is uncoupled and replaced on hanger 11 for the use of the next boat which docks at that station.

Special means can be provided (exemplified by pump 19, line 14, pump house 15, hose 16 and truck 17) for emptying each tank 3. If tank 3 is portable, however, it need only be detached from its inlet and vent lines, towed to some remote location, pumped out, flushed, returned and connected for further use.

In the installation presented in the drawings, vent 13 can, alternatively, be used for flushing and washing tank 3. An appropriate medium may be pumped (from the pump house) into vent 13, thus forcing the collected sewage from tank 3 through the outlet pipe 14.

The invention and its advantages are readily understood from the preceding description. It is apparent that various changes may be made in the form, construction and arrangement of parts without departing from the spirit and scope of the invention or sacrificing its material advantages. The forms hereinbefore described and illustrated in the drawings are merely preferred embodiments of said invention.

What is claimed is:

1. In a marina with a wharf docking facility for at least one boat having an on-board waste facility and effluent discharge means communicating therewith, a sewage collection and storage system comprising submerged storage means secured under water and having an inlet, an outlet and vent means, the system having (a) means for conveying the effluent from the boat to the inlet of the submerged storage means, the conveying means having means for connecting said conveying means to the effluent discharge means, and (b) means for discharging effluent in the storage means through conduit means from the storage means outlet to shore; said system being positioned so as to minimize possible contact with any undocked boat, and said storage means being anchored so that said inlet is at a lower elevation than the discharge means communicating with the on-board waste facility.

2. A sewage collection and storage system according to claim 1 wherein said conveying means comprises flexible hose and fixed piping, the fixed piping being connected at one end to the storage means inlet and at the other end to the flexible hose, said other end being under water and secured at a higher elevation than said inlet and at a lower elevation than the effluent discharge means communicating with the on-board waste facility and said flexible hose having a free end.

3. A sewage collection and storage system according to claim 2 wherein the wharf docking facility has secured thereto a support for the free end of the flexible hose when said hose is not in use.

4. A sewage collection and storage system according to claim 2 wherein the fixed piping comprises a service line and a conduit from said service line to said storage means inlet, the service line having a plurality of openings, each operatively connected to flexible hose for conducting sewage from the waste facility to the service line.

5. A sewage collection and storage system according to claim 4 wherein the service line is a pipe having two legs meeting at a vertex at a lower elevation than either end, and the conduit is connected to the service line at the vertex of the latter.

6. A sewage collection and storage system according to claim 4 wherein each flexible hose is located at a station for docking a boat at the wharf, the wharf being provided with a hanger at each station for securing the free end of the flexible hose when said flexible hose is not in use.

7. In a marina with a docking facility for at least one boat having an on-board waste facility and access to effluent thereof, a sewage collection system comprising (a) storage means secured under water and having inlet, outlet and vent means, (b) first conduit means for carrying the effluent from the boat to the inlet means and (c) means for discharging effluent in the storage means through second conduit means from the outlet means to shore; said system being positioned so as to minimize possible contact with any undocked boat, and said storage means being anchored so that said inlet means is at a lower elevation than the access to effluent of the on-board waste facility.

8. A sewage collection system according to claim 7 wherein the storage means comprises at least one tank, each having an inlet, an outlet and venting means, the first conduit means comprises flexible hose and fixed piping, the fixed piping being fixed at one end to the inlet of each operative tank and at the other end to at least one flexible hose, said other end being under water and secured at a higher elevation than said inlet and at a lower elevation than the access to effluent of the on-board waste facility, each flexible hose having a free end with coupling means for securing same to said access to effluent of the on-board waste facility.

9. A sewage collection system according to claim 8 wherein the fixed piping comprises a service line and conduit from the service line to the inlet of each operative storage tank, the service line having a plurality of openings, each of which is operatively connected to one of the flexible hoses, and the docking facility having secured thereto means to support the free end of each flexible hose when said flexible hose is not in use.

References Cited

UNITED STATES PATENTS

| | | | |
|---|---|---|---|
| 1,654,073 | 12/1927 | Fagan | 137—236 X |
| 2,514,230 | 7/1950 | Feazel | 4—114 |
| 2,731,168 | 1/1956 | Watts | 137—236 X |
| 2,772,420 | 12/1956 | Carter | 4—114 X |
| 3,114,384 | 12/1963 | Quase | 137—236 |

FOREIGN PATENTS 4,290    2/1902    Great Britain.

LAVERNE D. GEIGER, Primary Examiner

E. J. EARLS, Assistant Examiner

U.S. Cl. X.R.

4—10; 137—236; 141—383